Figure 3:
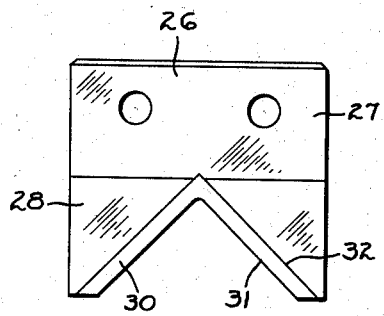

Jan. 13, 1959 J. H. HITCHCOCK 2,868,292
SHEAR
Filed Jan. 16, 1956 3 Sheets-Sheet 1
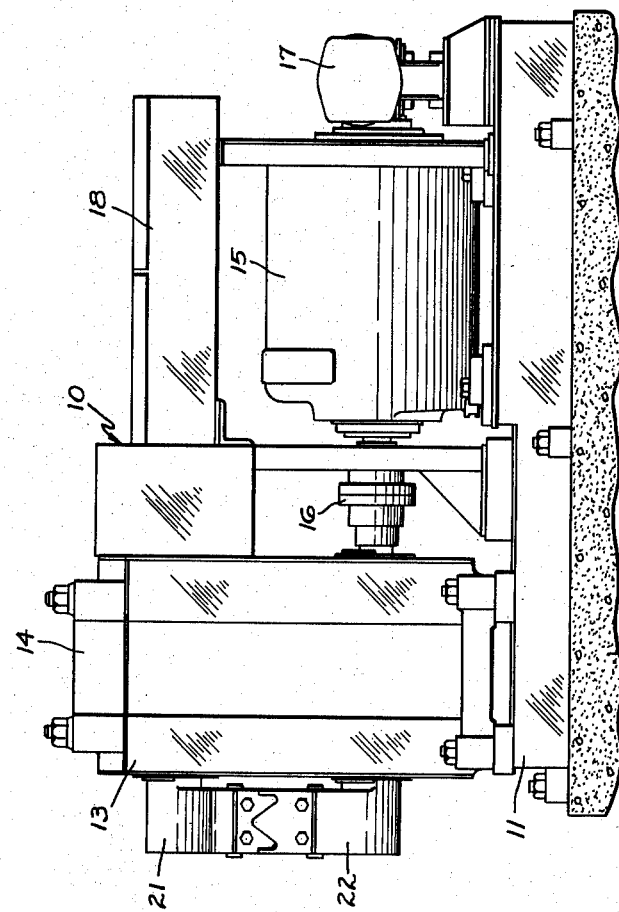
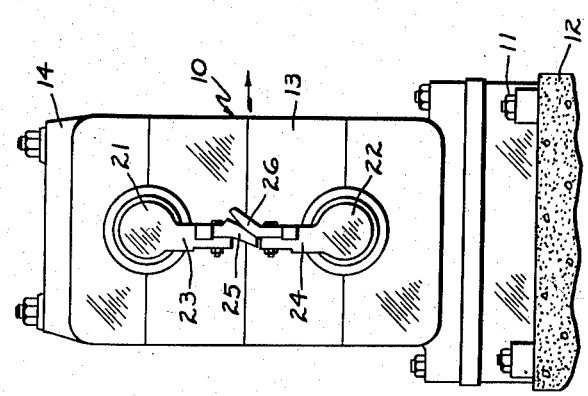
INVENTOR.
John H. Hitchcock
BY
Norman S. Blodgett
Attorney INVENTOR.
John H. Hitchcock
BY
Norman S. Blodgett
Attorney INVENTOR
John H. Hitchcock United States Patent Office 2,868,292
Patented Jan. 13, 1959

2,868,292

SHEAR

John H. Hitchcock, Worcester, Mass., assignor to Morgan Construction Company, Worcester, Mass., a corporation of Massachusetts Application January 16, 1956, Serial No. 559,408

7 Claims. (Cl. 164—66)

This invention relates to a shear and more particularly to apparatus arranged to sever a rapidly-moving length of metal.

It is customary to divide long lengths of products delivered for handling on a cooling bed, where the product is supported in order to be kept straight while it cools. This division of product into cooling bed lengths must be accomplished by a "flying" shear which cuts the product into selected lengths while the material is in motion. Various types of flying shears are employed for this purpose, but in the past none of the various types has been satisfactory for use on irregularly shaped sections such as angles. For example, a type of shear commonly used for this purpose carries cutting blades extending outwardly from the surfaces of drums rotating on parallel axes, the shear blades being parallel to the axes of the drums. Use of this type of shear to divide irregular sections such as angles flattens the section at the point of divisions, deforming the section so badly that it becomes impossible to keep the product straight while traveling to and across the cooling bed. This difficulty is common to all of the various types of shears previously used for this purpose. An alternative commonly practiced is to divide the piece to be rolled before it enters the rolling mill, while it has a shape suitable for division by shear knives of conventional form; this is objectionable because it reduces the mill output, doubles the hazard of cobbles, and reduces also the proportion of acceptable product. These and other difficulties of like nature have been eliminated by the present invention.

It is, therefore, an outstanding object of the present invention to provide a shear which will cut metal of irregular cross-sectional form without significant deformation thereof.

Another object is the provision of a rotary flying shear for cutting angle iron and the like, which shear is simple in construction, inexpensive to manufacture, and requires little maintenance.

A still further object of the invention is the provision of a shear for cutting rolled shapes, which knives are formed to cut various parts of the cross-section at different times and to support completely the part being cut.

With these and other objects in view, as will be apparent to those skilled in the art, the invention resides in the combination of parts set forth in the specification and covered by the claims appended hereto.

Figure 4:
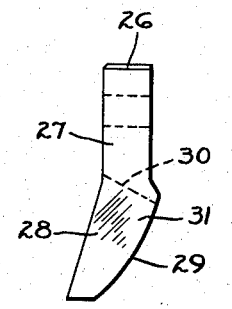
Figure 5:
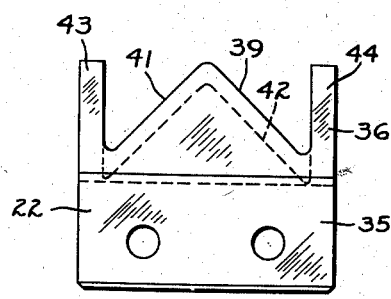
Figure 6:
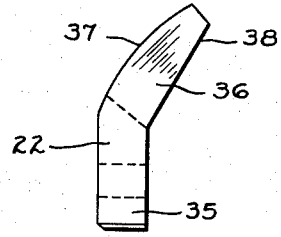
Figure 7:
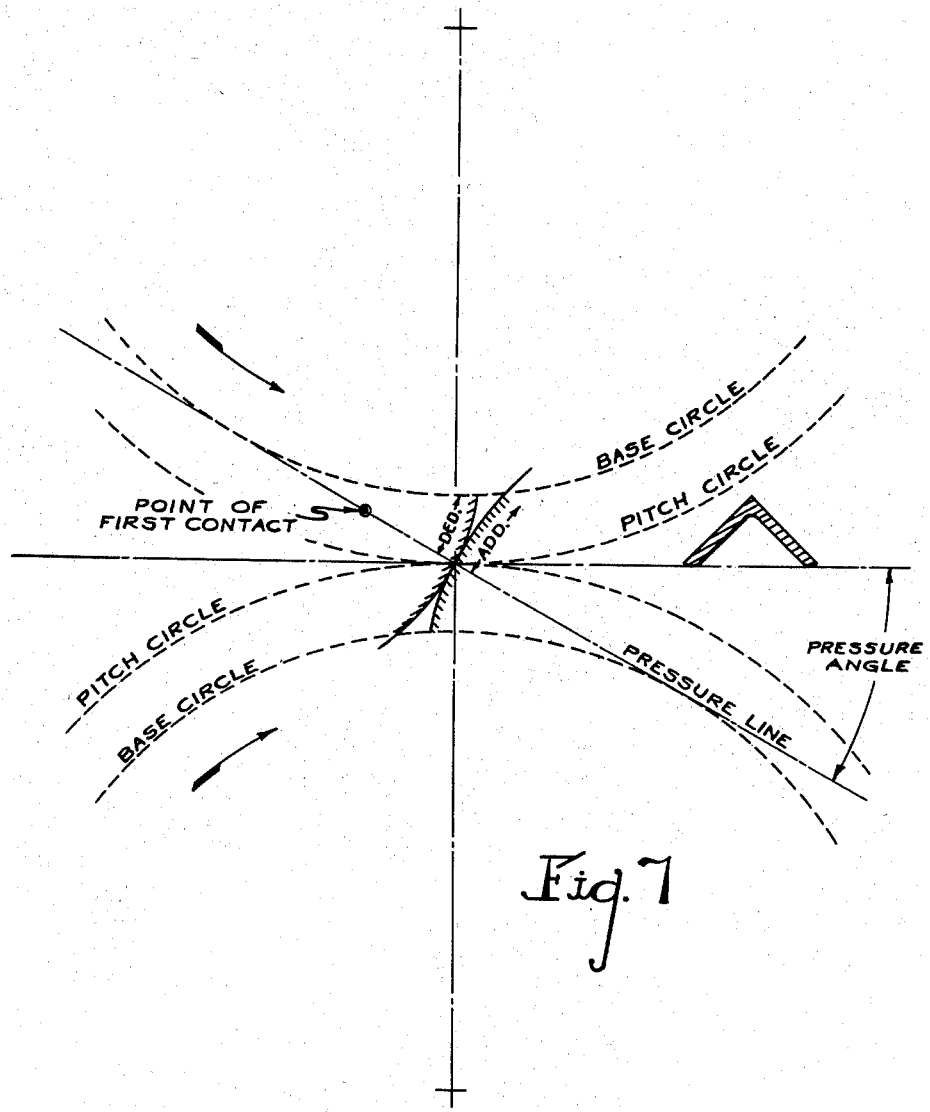

The character of the invention, however, may be best understood by reference to certain of its structural forms, as illustrated by the accompanying drawings in which:

Figure 1 is an elevational view of a shear embodying the principles of the invention looking transversely of the path of the material to be cut, Figure 2 is an elevational view of the shear as observed when looking longitudinally thereof, Figures 3 and 4 are elevational views of the upper knife of the shear, Figures 5 and 6 are elevational views of the lower knife, and Figure 7 is a schematic view of the knife layout and of the relationship between the blades during operation.

In this specification, the expression "transverse" and the like will indicate a direction at right angle to the direction of movement of the material to be cut, while "longitudinal" will indicate the direction of movement of the said material. Furthermore, the expression "rearward" and "forward" relate to the direction of motion of the material being severed. The expressions "pitch circle," "dedendum," "addendum," "base circle" and "pressure angle" are used in accordance with the generally accepted definitions, as particularly set forth in Machinery's Handbook, 15th Edition on pages 648, 649 and 650.

Referring first to Figures 1 and 2, wherein are best shown the general features of the invention, the shear, indicated generally by the reference numeral 10, comprises a base 11 mounted on a foundation 12. Bolted to the base is a housing 13 containing the drive and transmission gearing of the shear; access to the housing is provided by a cover 14 bolted to the upper part of the housing. A drive motor 15 is also mounted on the base and is connected through a coupling 16 to the gearing in the housing. Control apparatus 17 for the shear is mounted on the base and is connected to the motor. The motor and associated equipment are protected from damage by a hood 18 extending from the shear housing more or less co-extensively with the base 11.

Extending transversely from the shear housing on the side thereof opposite the motor are two generally cylindrical drums 21 and 22. The axes of these drums are vertically spaced and parallel to each other. Extending generally radially from the upper drum 21 is a knife holder 23, while a similar knife holder 24 forms a part of the lower drum 22. The drums are connected to the gearing within the shear housing in such a manner that at one point in the cycle of rotation, the knife holders are vertical and aligned, as they appear in the drawing. Each knife holder is recessed at its outward end to receive a knife; an upper knife 25 is bolted in the recess of the upper knife holder 23, while a lower knife 26 is bolted in the recess of the lower knife holder 24. The shanks of the knives and the recesses are so formed that, when the knife holders are vertical, the center lines of the knife shanks are aligned and pass through the centers of the drums. The arrow indicates the direction of movement of the material being severed and of the knives at the time of engagement.

Referring now to Figures 3 and 4, the upper knife 25 is shown as having a shank 27 with bolt holes formed therein for attachment to the knife holder 23. The remainder of the knife is occupied by the cutting portion 28 which is provided with a forward transverse surface 29 of involute form. The involute surface is shaped so that when the knife 25 is bolted to the knife holder, the axis of the drum 21 is also the center of the base circle of the involute. The base circle selected is of a small diameter, i. e., somewhat the same diameter as the drum 21, so that the involute has a very small radius of curvature. Furthermore, the involute is selected so that the pitch circle lies at the midpoint between the axes of the two drums and passes through the knife near its outer tip. As is evident in Figure 3, which is a view of the knife from the rear, the knife is provided with what might be loosely described as a V-shaped notch 30 extending longitudinally therethrough. The intersection of the notch with the involute surface 29 is the cutting edge 31 of the knife. This intersection would be more accurately described as the projection onto the involute surface from a plane tangential to the involute surface adjacent the shank 27 of a true V-shaped configuration lying in that plane. The sides of the notch sweep rearwardly and away from each other, so that they eventually intersect the rearward surface of the knife along a much larger V-shaped line 32 than the edge 31. This gives rake to the edge and must be selected great enough to give good cutting freedom but not great enough to make the edge weak.

As has been stated, the pitch circle of the involute is located near the tip of the knife, so this means that the portion of the involute in which the cutting edge 31 lies is entirely in the dedendum portion.

In Figures 5 and 6 are shown the details of construction of the lower knife 26. This knife is provided with a shank 35 having holes for attachment to the knife holder and with a cutting portion 36. The cutting portion has a rearward surface 37 in the form of an involute and a plane forward surface 38. The involute surface is similar to that of the other knife with certain important exceptions. The points of similarity are that it has the center of its base circle on the axis of its drum 22, and the base circle is of the same diameter; also, its pitch circle is the same diameter as that of the upper knife and it is tangential, naturally, to the pitch circle of the upper knife at the midpoint between the drums. However, the portion of the involute that defines the surface 37 is selected such that the pitch circle passes through the knife adjacent the junction of the cutting portion to the shank; this means that most of the surface 37 is in the form of the addendum of the involute. In Figure 5, which is a view of the knife 26 as it appears when viewed from the rear, it can be seen that the knife is formed to have a V-shaped point 39. A cutting edge 41 is defined by the intersection of the involute surface 37 with the planes defining the point; these planes sweep forwardly to give cutting clearance and intersect the forward surface 38 on a smaller V-shaped configuration 42. Aligning abutments 43 and 44 are located on either side of the cutting point 39.

In Figure 7 is shown the manner in which the engaging knife surfaces are formed and in which they operate in a manner similar to a pair of gear teeth. The surfaces of the knives are of involute form, i. e., they have the curvature formed by the end of a cord as it is unwrapped from the base circle. Each knife has a pitch circle which is concentric with its base circle; these pitch circles are tangential to one another. The "dedendum" of each knife circle is that portion lying between its base circle and its pitch while its "addendum" is that portion lying outside its pitch circle. As the involute surfaces engage, the successive points of contact lie along a straight line called the "pressure line" and the "pressure angle" is the angle between this line and an imaginary line tangential to both pitch circles and extending at a right angle to a line joining the centers of the base circles. The situation illustrated is that point in knife contact when the angle iron has just been cut and sliding motion of the knife surfaces toward one another has been completed.

The operation of the apparatus will be readily understood in view of the above description. The stock to be severed passes between the two drums 21 and 22 on a level with the midpoint. If the stock is an angle the junction of the flanges will be uppermost, while the flanges extend downwardly, in the manner of a tent. When a cut is desired the motor 15 rotates the drums in the usual way and the knife holders and the knives swing toward engagement with the stock. As viewed in Figure 1, the assemblage of the upper drum, knife holder and knife rotates counter-clockwise, while the assemblage of the lower drum, knife holder and knife rotate in a clock-wise manner. As the knives approach the position shown in Figure 1, the involute surface 29 of the upper knife 26 engages the involute surface 37 of the lower knife 22. Since the base circles, pressure angles and pitch circles are the same, and the pitch circles are tangential, the surfaces will engage in the manner of two gear teeth. As a matter of fact, since the surface of the upper knife is largely dedendum and the surface of the lower knife is largely addendum, the action between the knives most nearly resembles the action between the rearward surface of a tooth of one gear and the forward surface of the following tooth of the other gear when they first engage. As the knives engage, the upper edge of the angle stock is pressed into the apex of the V-shaped cutting edge 31, while the upper part of the point 39 is pressed into the corner of the angle. As the relative movement of the knives progresses, the point pierces the upper junction of the angle stock. Further relative movement causes shearing down the flanges of the stock until, eventually, the edges of the flanges are reached and the stock is completely severed. It will be understood that the contact between the involute surfaces is so-called "line" contact and the line of contact is transverse. In practice, however, the shearing of the metal causes contact to take place in a narrow transverse band. In the present case, by using base circles of small diameter, the curvature of the involutes is very great and the area of contact is reduced to a minimum. It will be understood that the smaller the contact between the surfaces, the smaller the contact between the cutting edges 31 and 41; theoretically, this would be "point" contact. Now, if this cutting action were taking place with stock of very little thickness, as would be the case, for instance, if an angle were formed of paper, the cutting action of the knives would progress down the sides of the angle like a pair of shears. In practice, however, the angle iron has considerable thickness, but the action is very similar. At every instant of the cutting action the metal is being cut by a knife edge on each side of the material. That is to say, no cutting takes place at any time by an edge without a corresponding edge pressing on the other side of the material. There can, therefore, be no collapse of the angle as has been the case when an angle or the like is severed in a conventional shear. In a conventional shear the edge of the flanges are engaged by one straight cutting edge, while the other cutting edge strikes the junction of the angle; the result is that the angle is deformed by sidewise spreading.

The significance of the particular portions of the involutes used for the engaging surfaces of the knives should be noted. When the addendum of the rearward surface of a gear tooth on one gear engages the addendum of the tooth which follows it on the other gear, there is a sliding action between the two; they slide apart. This takes place in the period just before the teeth separate. When these same gear teeth first engage, however, the addendum of the first tooth engages the dedendum of the other tooth and they slide toward each other. Of course, when the engagement is at the pitch circle no sliding takes place and the only relative motion is pure rocking. As a matter of fact, there is very little sliding engagement for some distance on either side of the pitch circle. The present shear must be constructed so that the knives slide together, thus moving the cutting edges together to produce cutting.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A shear for cutting stock of irregular cross-section comprising two rotatable drums having parallel axes, a knife mounted on each drum for rotation therewith, the knives being formed with engaging surfaces of involute form, the portion of one knife in which cutting takes place being formed as the dedendum of an involute, while that portion of the other knife is formed as the addendum of an involute.

2. A shear for cutting stock of irregular cross-sectional form, comprising two rotatable drums having parallel axes, a knife mounted on each drum for rotation therewith, the knives being formed with engaging surfaces of similar involute form, the portion of one knife in which cutting takes place being formed as the dedendum of the involute, while that portion of the other knife is formed as the addendum of the involute, the involute defining the engaging surface of each knife having the center of its base circle on the axis of the drum on which its knife is mounted, the diameter of the base circles, the diameter of the pitch circles and the pressure angles of the involutes being the same, the pitch circles being tangential at the midpoint between the two drums.

3. A shear for cutting stock of irregular cross-sectional form, comprising two rotatable drums having parallel axes, a knife mounted on each drum for rotation therewith, the knives being formed with engaging surfaces of involute form, the portion of one knife in which cutting takes place being formed as the dedendum of the involute, while that portion of the other knife is formed as the addendum of the involute, both involutes having base circles of the same diameter, which diameter is considerably smaller than the diameter of the pitch circle.

4. A shear for cutting stock of irregular cross-sectional form, comprising two rotatable drums having parallel axes, a knife mounted on each drum for rotation therewith, the knives being formed with engaging surfaces of involute form parallel to the drum axes, the portion of one knife in which cutting takes place being formed as the dedendum of the involute, while that portion of the other knife is formed as the addendum of the involute, each knife being formed at a right angle to the drum axes to conform to the form of the stock to be cut.

5. A shear for cutting stock of irregular cross-sectional form, comprising two rotatable drums having parallel axes, a knife mounted on each drum for rotation therewith, the knives being formed with engaging surfaces of involute form engaging in relative sliding movement while cutting, with one knife preceding the other, the rearward surface of the knife which precedes being formed as the addendum of the involute, while the forward surface of the knife which follows is formed as the dedendum of the involute.

6. A shear for angle stock comprising two rotatable drums one above the other having parallel axes, a knife mounted on each drum for rotation therewith, the knives being formed with engaging surfaces of involute form parallel to the drum axes, the knives engaging in relative sliding movement toward each other while cutting, with one knife preceding the other, the portion in which cutting takes place of the knife which follows being formed as the dedendum of the involute, while that portion of the knife which leads is formed as the addendum of the involute, the upper knife having a V-shaped notch at a right angle to the drum axis, while the lower knife is formed with an inverted V-shaped point cooperating with the notch in the upper knife, both involutes having base circles of the same diameter, which diameter is considerably smaller than the diameter of the pitch circle, the involute defining the engaging surface of each knife having the center of its base circle on the axis of the drum on which its knife is mounted, the diameters of the base circles, the diameters of the pitch circles and the pressure angles of the involutes being the same, the pitch circles being tangential at the midpoint between the two drums.

7. A shear for cutting stock of elongated form, comprising two rotatable drums having parallel axes, a knife mounted on each drum for rotation therewith, the knives being formed with engaging surfaces of conjugate form, the portion of one knife in which cutting takes place being formed as the dedendum of the conjugate form, while that portion of the other knife is formed as the addendum of the conjugate form.

References Cited in the file of this patent

UNITED STATES PATENTS

| | | |
|---|---|---|
| 1,948,796 | Muller | Feb. 27, 1934 |
| 2,125,939 | MacFarren | Aug. 9, 1938 |

FOREIGN PATENTS

| | | |
|---|---|---|
| 282,243 | Germany | Feb. 19, 1915 |
| 464,803 | Germany | Aug. 27, 1928 |